United States Patent [19]

Kubo et al.

[11] Patent Number: 5,263,333
[45] Date of Patent: Nov. 23, 1993

[54] MULTI-TYPE AIR CONDITIONER SYSTEM WITH OPTIMUM CONTROL FOR GASEOUS FLOW ADJUSTMENT VALVE AND LIQUID EXPANSION VALVE

[75] Inventors: Tooru Kubo; Yoshinobu Fujita, both of Fuji; Toshiaki Kawamura; Mitsunobu Maezawa, both of Shimizu, all of Japan

[73] Assignee: Kabushiki Kaisha Toshiba, Kawasaki, Japan

[21] Appl. No.: 786,765

[22] Filed: Nov. 1, 1991

[30] Foreign Application Priority Data

Nov. 2, 1990 [JP] Japan .................. 2-295457

[51] Int. Cl.⁵ .................. F25B 13/00; G05B 13/02
[52] U.S. Cl. .................. 62/160; 62/175; 62/206; 364/163; 395/61
[58] Field of Search .................. 395/61, 900; 62/175, 62/23, 160, 206; 364/163

[56] References Cited

FOREIGN PATENT DOCUMENTS 63-61844 3/1988 Japan .
2-85960 7/1990 Japan .
2215867 9/1989 United Kingdom .
2229551 9/1990 United Kingdom .
2230873 10/1990 United Kingdom .

OTHER PUBLICATIONS

Umbers et al., Man-Machine Studies 1980, pp. 11-23.
Sugiyama, Rule Based Self-Organising Controller 1988, pp. 341-353.
Mamdani, Application of Fuzzy Algorithms for Control of Simple Dynamic Pant, Dec. 1974, pp. 1585-1588.

*Primary Examiner*—William E. Wayner
*Attorney, Agent, or Firm*—Cushman, Darby & Cushman

[57] ABSTRACT

An outdoor unit has a compressor and an outdoor heat exchanger. Each of a plurality of indoor units has an indoor heat exchanger. The outdoor unit is connected in parallel with the plurality of indoor units to form a multi-type air conditioner system having a plurality of refrigeration cycles. A plurality of gaseous flow adjustment valves are provided to the gaseous sides of the indoor units, respectively. A plurality of liquid expansion valves are provided to the liquid sides of the indoor unit, respectively. A refrigerant super-heat degree detector detects a refrigerant super-heat degree of the outdoor heat exchanger or the indoor heat exchangers. A controller controls a capacity of the compressor and opening degrees of the gaseous flow adjustment valves in accordance with required capacities of the indoor units, and controls the liquid expansion valves in accordance with a detection output from the refrigerant super-heat degree detector such that the refrigerant super-heat degree becomes a predetermined value. The controller includes an optimum control unit for controlling opening degrees of at least one of the gaseous flow adjustment valves and the liquid expansion valves in accordance with operating states of the multi-type air conditioner system such that the operating states become optimum, respectively.

10 Claims, 8 Drawing Sheets

MULTI-TYPE AIR CONDITIONER SYSTEM WITH OPTIMUM CONTROL FOR GASEOUS FLOW ADJUSTMENT VALVE AND LIQUID EXPANSION VALVE

BACKGROUND OF THE INVENTION

1. Field of the Invention

The present invention generally relates to a multi-type air conditioner system and, more particularly, to a multi-type air conditioner system comprising a single outdoor unit and a plurality of indoor units.

2. Description of the Related Art

As is well known, in a multi type air conditioner system comprising a single outdoor unit and a plurality of indoor units, the outdoor unit has a compressor, a four-way valve, and an outdoor heat exchanger, and each indoor unit has an indoor heat exchanger. Parallel circuits of the compressor, the four-way valve, the outdoor heat exchanger, and the respective indoor heat exchangers are connected to constitute a plurality of heat pump type refrigeration cycles. An electronic expansion valve is provided to a liquid pipe between the outdoor heat exchanger and each indoor heat exchanger, and an electronic flow adjustment valve is provided to a gas pipe between each indoor heat exchanger and the four-way valve.

That is, in the cooling operation mode, the refrigerant discharged from the compressor is flowed through the four-way valve, the outdoor heat exchanger, the respective electronic expansion valves, the respective indoor heat exchangers, and the respective flow adjustment valves to cause the outdoor heat exchanger and the respective indoor heat exchangers to serve as a condenser and evaporators, respectively. The opening degrees of the respective flow adjustment valves are controlled in accordance with the required capacities of the respective indoor units, and the refrigerant super-heat degrees in the respective indoor heat exchangers serving as the evaporators are detected. The opening degrees of the respective electronic expansion valves are controlled so that the detected refrigerant super-heat degrees become preset values.

In the heating operation mode, the refrigerant discharged from the compressor is flowed through the respective flow adjustment valves, the respective indoor heat exchangers, the respective electronic expansion valves, and the outdoor heat exchanger to cause the respective indoor heat exchangers and the outdoor indoor heat exchanger to serve as condensers and an evaporator, respectively. The opening degrees of the respective flow adjustment valves are controlled in accordance with the required capacities of the respective indoor units, and the refrigerant super-heat degree in the outdoor heat exchanger serving as the evaporator is detected. The opening degrees of the respective electronic expansion valves are controlled so that the detected refrigerant super-heat degree becomes a preset value.

Upon starting of the operation, i.e., upon starting of the compressor, first, the liquid expansion valves are opened to predetermined opening degrees and this state is kept for a predetermined period of time. Then, normal opening degree control in accordance with the refrigerant super-heat degree is started.

In this case, the predetermined opening degrees are kept first. This is to cope with the unstable refrigerant super-heat degree itself immediately after start of the operation.

Regarding a stopped (including idling) indoor unit, the corresponding electronic expansion valve and flow adjustment valve are completely opened to block inflow of the refrigerant.

In the above conventional multi-type air conditioner system, since optimum control is not necessarily performed for the gaseous flow adjustment valves and the liquid expansion valves, many problems arise as follows.

I. First, as a control scheme of a refrigerant super-heat degree of an air conditioner system, PID control is generally performed.

In a multi-type air conditioner system, however, a change in operating state of each indoor unit appears as a large state change in the refrigeration cycle as a control target. For this reason, the PID control, which determines control parameters of the gaseous flow adjustment valves and the liquid expansion valves by regarding the control target as a linear system, lacks flexibility against a change in state of the refrigeration cycle. A refrigerant super-heat degree may overshoot the preset value, or a hunting may occur.

II. In the conventional multi-type air conditioner system, upon start of the compressor, the liquid electronic expansion valves are first kept at predetermined opening degrees. However, this causes an undesirable state in which the suction-side refrigerant pressure of the compressor is largely decreased.

A refrigerant suction amount of a compressor is determined by a difference in refrigerant pressure between the discharge side and the suction side. Therefore, when the suction-side refrigerant pressure is largely decreased, as described above, the refrigerant suction amount of the compressor is increased, and the liquid refrigerant stored in the low-pressure-side pipe of the refrigeration cycle is quickly drawn by vacuum in the compressor. This so-called liquid return phenomenon is not preferable as it damages the compressor.

III. The liquid electronic expansion valve and the gaseous flow adjustment valve corresponding to a stopped (including idling) indoor unit are completely opened.

Then, the refrigerant is stored in the indoor heat exchanger, and shortage of the refrigerant flow amount in the refrigeration cycle as a whole may occur. In other words, the capability may become short in an operating indoor unit.

In order to solve this problem, a refrigerant return bypass having a capillary tube may be provided to recover the refrigerant. Bypasses are, however, required corresponding in number to the indoor units, complicating the configuration and increasing the cost.

IV. In the heating operation mode, a large pressure acts on two sides of a liquid flow adjustment valve corresponding to a stopped (including idling) indoor unit.

As a result, when the liquid flow adjustment valve is opened upon start (including resumption) of the operation under a state in which the pressure is not balanced, loud refrigerant noise may occur to annoy people around the indoor unit. In addition, the liquid flow adjustment valve needs to have a large drive motor in order to cope with the large pressure difference, resulting in an increase in cost.

In order to solve this problem, the capability of the compressor may be decreased before opening the liquid flow adjustment valve. Then, however, the compressor cannot cope with the requested capabilities of the respective indoor units. Indoor temperature control may be adversely affected to impair the amenity.

SUMMARY OF THE INVENTION

It is, therefore, an object of the present invention to provide a new and improved multi-type air conditioner system which can control a gaseous flow adjustment valve and a liquid expansion valve at an optimum state in accordance with an operating state.

It is another object of the present invention to provide a multi-type air conditioner system which can particularly constantly maintain a refrigerant super-heat degree at an optimum state while keeping good responsiveness against a change in state of the refrigeration cycle, thus enabling stable and efficient air conditioning.

It is still another object of the present invention to provide a multi-type air conditioner system in which liquid returning to a compressor to damage it is prevented, thereby improving reliability.

It is still another object of the present invention to provide a multi-type air conditioner system in which storing of the refrigerant in a stopped (including idling) indoor heat exchanger is eliminated without complicating the configuration or increasing the cost, thereby solving a shortage in the refrigerant flow amount in an operating indoor unit. Also, uncomfortable refrigerant noise is prevented from being produced upon start of the operation of a stopped (including idling) indoor unit, and a load on a flow adjustment valve can be decreased, thereby reducing the cost and size of a drive motor of the flow adjustment valve.

It is still another object of the present invention to provide a multi-type air conditioner system in which uncomfortable refrigerant noise is prevented from being produced upon start of the operation of a stopped (including idling) indoor unit and a load on a flow adjustment valve can be decreased, thereby reducing the cost and size of a drive motor of the flow adjustment valve.

According to the first aspect of the present invention, there is provided a multi-type air conditioner system comprising:

an outdoor unit having at least a compressor and an outdoor heat exchanger;

a plurality of indoor units having at least indoor heat exchangers, respectively;

refrigeration cycle means in which the outdoor unit is connected in parallel with the plurality of indoor units to form a plurality of refrigeration cycles;

a plurality of gaseous flow adjustment valves provided to gaseous sides of the plurality of indoor units;

a plurality of liquid expansion valves provided to liquid sides of the plurality of indoor units;

refrigeration super-heat degree detecting means for detecting a refrigerant super-heat degree of the outdoor heat exchanger or the plurality of indoor heat exchangers; and control means for controlling a capacity of the compressor and opening degrees of the gaseous flow adjustment valves in accordance with required capacities of the plurality of indoor units, and controlling the plurality of liquid expansion valves in accordance with a detection output from the refrigeration super-heat degree detecting means so that the refrigerant super-heat degree becomes a predetermined value, the control means including optimum control means for controlling opening degrees of at least one of the plurality of gaseous flow adjustment valves and the plurality of liquid expansion valves in accordance with operating states of the multi-type air conditioner system such that the operating states become optimum, respectively.

In an air conditioner system according to the second aspect of the present invention, the opening degree of each gaseous flow adjustment valve is controlled in accordance with the required capacity of the corresponding indoor unit. Furthermore, the refrigerant super-heat degree of each indoor heat exchanger or the outdoor heat exchanger is detected, and a difference between the refrigerant super-heat degree and a preset value, and a change amount in the difference are obtained. A necessary amount of change in opening degree matching the present state of each liquid electronic expansion valve is calculated by a fuzzy operation based on the obtained difference and the change amount. The opening degree of each electronic expansion valve is controlled in accordance with the calculated necessary amount.

In an air conditioner system according to the third aspect of the present invention, the opening degree of each gaseous flow adjustment valve is controlled in accordance with the required capacity of the corresponding indoor unit. Furthermore, the refrigerant super-heat degree of each indoor heat exchanger or the outdoor heat exchanger is detected. Upon start of the compressor, each liquid expansion valve is first opened wide and then closed to a predetermined opening degree. Thereafter, the opening degree of each electronic expansion valve is controlled such that the detected refrigerant super-heat degree becomes a preset value.

In an air conditioner system according to the fourth aspect of the present invention, the opening degree of each gaseous flow adjustment valve is controlled in accordance with the required capacity of the corresponding indoor unit. Furthermore, the refrigerant super-heat degree of each indoor heat exchanger or the outdoor heat exchanger is detected, and the opening degree of each liquid electronic expansion valve is controlled so that the refrigerant super-heat degree becomes a preset value. In the cooling operation mode, a liquid electronic expansion valve corresponding to a stopped indoor unit is completely closed while a gaseous flow adjustment valve is completely opened. In the heating operation mode, a liquid electronic expansion valve and a gaseous flow adjustment valve corresponding to a stopped indoor unit are opened at predetermined opening degrees.

In an air conditioner system according to the fifth aspect of the present invention, the opening degree of each gaseous flow adjustment valve is controlled in accordance with the required capacity of the corresponding indoor unit. In the heating operation mode, the refrigerant super heat degree of the outdoor heat exchanger is detected, and the opening degrees of the respective liquid electronic expansion valves are controlled such that the refrigerant super-heat degree becomes a preset value. Furthermore, in the heating operation mode, as the number of operating indoor units is increased, the gaseous flow adjustment valve corresponding to the additional (newly started) indoor unit is gradually opened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3-I and 3-II are flow charts for explaining the operation of the first embodiment of the present invention;

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

A preferred embodiment of the present invention will be described with reference to the accompanying drawings.

Figure 1:
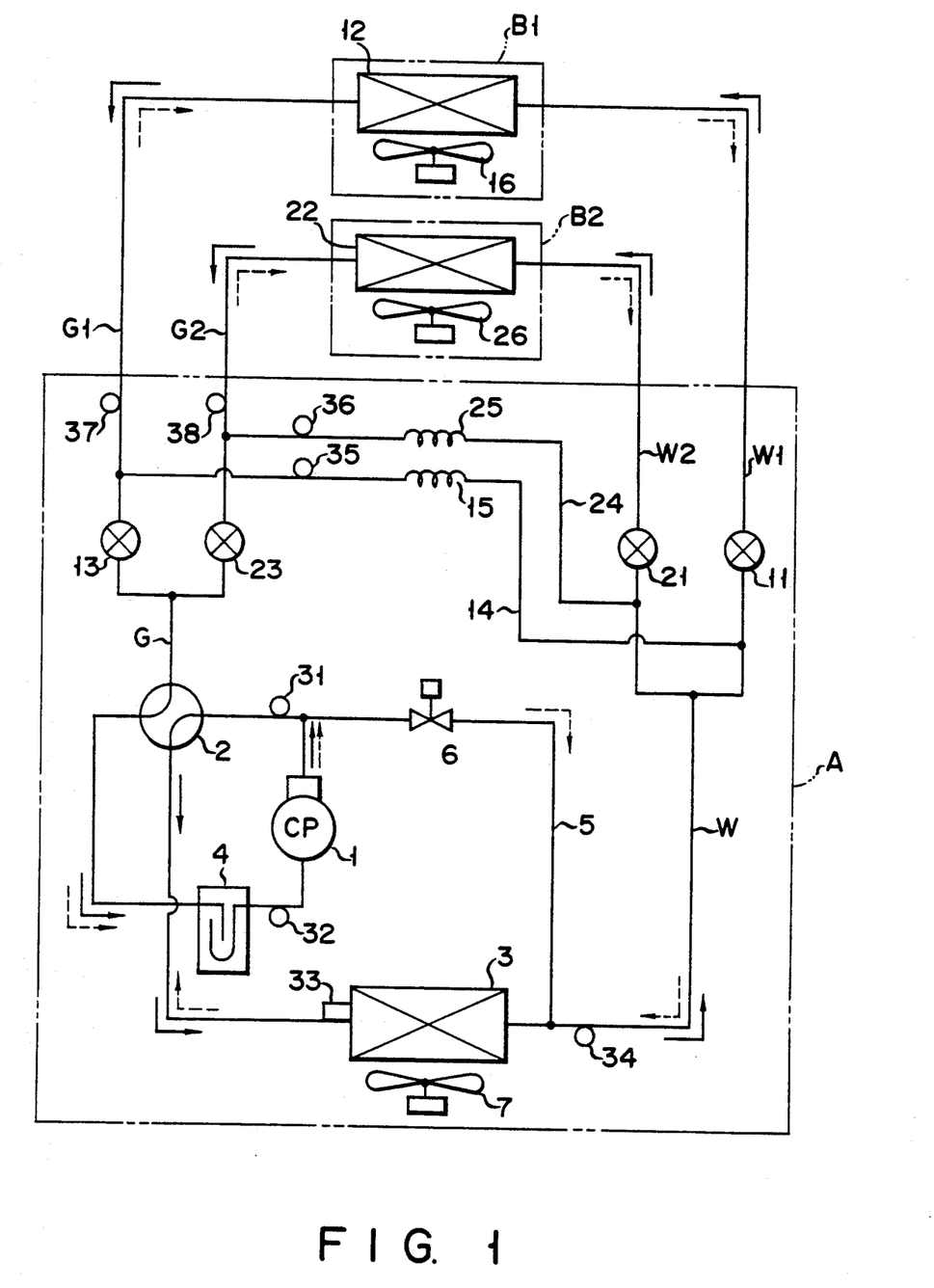
FIG. 1 is a view showing a configuration of a refrigeration cycle of a multi-type air conditioner system according to an embodiment of the present invention.

Referring to FIG. 1, reference symbol A denotes an outdoor unit; and $B_1$ and $B_2$, indoor units. The units A, $B_1$, and $B_2$ are connected to constitute two refrigeration cycles as follows.

The discharge port of a compressor 1 is connected to an outdoor heat exchanger 3 through a four-way valve 2. The outdoor heat exchanger 3 is connected to a liquid main pipe W. The liquid main pipe W is branched into liquid branch pipes $W_1$ and $W_2$. The liquid branch pipes $W_1$ and $W_2$ are connected to indoor heat exchangers 12 and 22. The liquid branch pipes $W_1$ and $W_2$ are provided with electronic expansion valves (pulse motor valves) 11 and 21 as pressure-reducing means.

The indoor heat exchangers 12 and 22 are connected to gaseous branch pipes $G_1$ and $G_2$, and the gaseous branch pipes $G_1$ and $G_2$ are provided with electric flow adjustment vales (pulse motor valves) 13 and 23.

The gaseous branch pipes $G_1$ and $G_2$ are coupled to a gaseous main pipe G, and the gaseous main pipe G is connected to the suction port of the compressor 1 through the four-way valve 2 and an accumulator 4.

The liquid main pipe W is connected to one end of a bypass 5. The other end of the bypass 5 is connected to a connecting pipe portion between the discharge port of the compressor 1 and the four-way valve 2. A two-way valve 6 is provided to the bypass 5.

One end of a bypass 14 is connected to the liquid branch pipe $W_1$ at a portion immediately after branching from the liquid main pipe W. The other end of the bypass 14 is connected to the gaseous branch pipe $G_1$ between the indoor heat exchanger 12 and the flow adjustment valve 13. A capillary tube 15 is provided to the bypass 14.

One end of a bypass 24 is connected to the liquid branch pipe $W_2$ at a portion immediately after branching from the liquid main pipe W. The other end of the bypass 24 is connected to the gaseous branch pipe $G_2$ between the indoor heat exchanger 22 and the flow adjustment valve 23. A capillary tube 25 is provided in the bypass 24.

An outdoor fan 7 is provided in the vicinity of the outdoor heat exchanger 3. Indoor fans 16 and 26 are provided in the vicinities of the indoor heat exchangers 12 and 22, respectively.

A refrigerant temperature sensor 31 for detecting a temperature of the refrigerant discharged from the compressor 1 is connected to a high-pressure-side pipe between the discharge port of the compressor 1 and the four-way valve 2.

A refrigerant temperature sensor 32 for detecting a temperature of the refrigerant drawn by vacuum into the compressor 1 is connected to a low-pressure-side pipe between the accumulator 4 and the suction port of the compressor 1.

A heat exchanger temperature sensor 33 is connected to the outdoor heat exchanger 3.

A refrigerant temperature sensor 34 for detecting a temperature of the refrigerant flowing in the outdoor heat exchanger 3 is connected to the liquid main pipe W.

A refrigerant temperature sensor 35 for detecting a refrigerant saturation temperature corresponding to a low-pressure-side pressure of the indoor unit $B_1$ in the cooling operation mode is connected to the other end side of the bypass 14.

A refrigerant temperature sensor 36 for detecting a refrigerant saturation temperature corresponding to a low-pressure-side pressure of the indoor unit $B_2$ in the cooling operation mode is connected to the other end side of the bypass 24.

A refrigerant temperature sensor 37 for detecting a temperature of the outlet port of the indoor heat exchanger 12 is connected to a side of the gaseous branch pipe $G_1$ which is closer to the indoor heat exchanger 12 than the connecting portion to the bypass 14.

A refrigerant temperature sensor 38 for detecting a temperature of the outlet port of the indoor heat exchanger 22 is connected to a side of the gaseous branch pipe $G_2$ which is closer to the indoor heat exchanger 22 than the connecting portion to the bypass 24.

Figure 2:
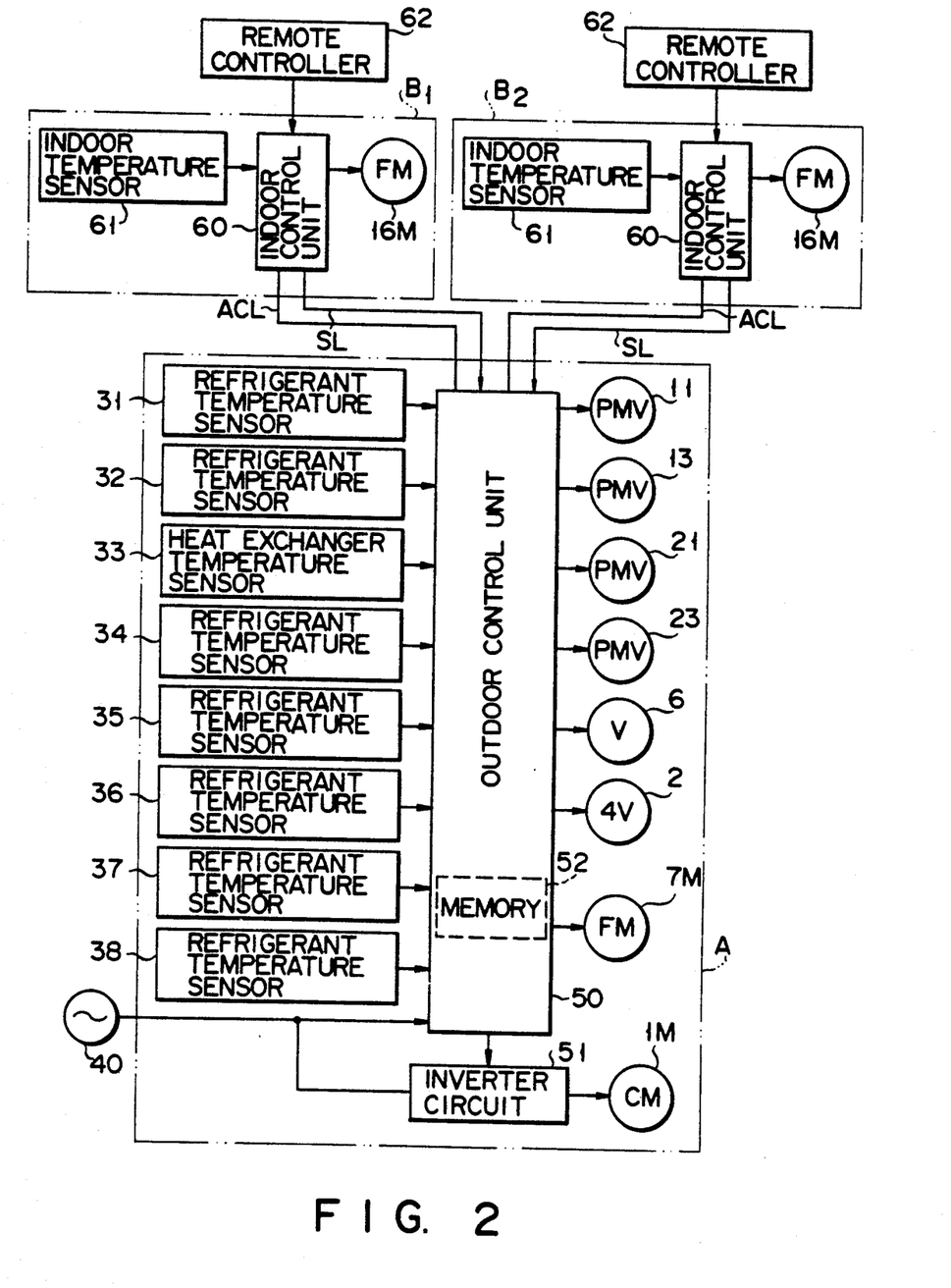
FIG. 2 is a block diagram showing a configuration of a control circuit of the first embodiment of the present invention.

FIG. 2 shows the control circuit of the above-described multi-type air conditioner system shown in FIG. 1.

Reference numeral 40 denotes a commercial AC power supply connected to an outdoor control unit 50 of the outdoor unit A.

The outdoor control unit 50 comprises a microcomputer and its peripheral circuits and performs overall control of the outdoor unit A.

The outdoor control unit 50 is connected to the electronic expansion valve 11, the flow adjustment valve 13, the electronic expansion valve 21, the flow adjustment valve 23, the two-way valve 6, the four-way valve 2, an outdoor fan motor 7M, the refrigerant temperature sensors 31, 32, 34, 35, 36, 37, and 38, the heat exchanger temperature sensor 33, and an inverter circuit 51.

The inverter circuit 51 rectifies the voltage of the commercial AC power supply 40, converts it to a voltage of a predetermined frequency (and level) in accordance with a command from the outdoor control unit 50, and outputs it. The output is supplied to a compressor motor 1M as the drive power.

The indoor unit $B_1$ has an indoor control unit 60. The indoor control unit 60 comprises a microcomputer and its peripheral circuits and performs overall control of the indoor unit $B_1$.

The indoor control unit 60 is connected to an indoor temperature sensor 61, a remote control type operation unit (to be referred to as a remote controller hereinafter) 62, and an indoor fan motor 16M.

The indoor unit $B_2$ has an indoor control unit 60.

The indoor control unit 60 comprises a microcomputer and its peripheral circuits and performs overall control of the indoor unit $B_2$.

The indoor control unit 60 is connected to an indoor temperature sensor 61, a remote controller 62, and an indoor fan motor 26M.

The indoor control units 60 are connected to the outdoor control unit 50 through corresponding power supply lines ACL and serial signal lines SL.

Each indoor control unit 60 has the following functions.

① A function of supplying an operation mode command and preset indoor temperature data based on an operation of the remote controller 62 to the outdoor control unit 50 in the form of a serial signal synchronized with the power supply voltage.

② A function of detecting a difference (i.e., an air conditioning load) between a detection temperature of the indoor temperature sensor 61 and the preset indoor temperature of the remote controller 62 and supplying it to the outdoor control unit 50 as a required capacity Q in the form of a serial signal synchronized with the power supply voltage.

The outdoor control unit 50 has the following functions.

① A function of flowing the refrigerant discharged from the compressor 1 to the four-way valve 2, the outdoor heat exchanger 3, the electronic expansion valves 11 and 21, the indoor heat exchangers 12 and 22, the flow adjustment valves 13 and 23, the four-way valve 2, and the accumulator 4 in accordance with cooling operation mode commands from the indoor units $B_1$ and $B_2$, thereby executing the cooling operation.

② A function of flowing the refrigerant discharged from the compressor 1 to the four way valve 2, the flow adjustment valves 13 and 23, the indoor heat exchangers 12 and 22, the electronic expansion valves 11 and 21, the outdoor heat exchanger 3, the four-way valve 2, and the accumulator 4 in accordance with heating operation mode commands from the indoor units $B_1$ and $B_2$, thereby executing the heating operation.

③ A function of executing initial opening degree control for the electronic expansion valves 11 and 21 when the compressor 1 is started upon start of the operation.

④ A function of controlling, during the operation, the capability of the compressor 1 (=an output frequency F of the inverter circuit 51) in accordance with the sum of the required capacities $Q_1$ and $Q_2$ of the indoor units $B_1$ and $B_2$.

⑤ A function of controlling, during the operation, the opening degrees of the flow adjustment valves 13 and 23 in accordance with the required capacities $Q_1$ and $Q_2$, respectively, of the indoor units $B_1$ and $B_2$.

⑥ A function of detecting, in the cooling operation mode, a difference in detection temperature between the refrigerant temperature sensors 35 and 37 as a refrigerant super heat degree TSH of the indoor heat exchanger 12 and of detecting a difference in detection temperature between the refrigerant temperature sensors 36 and 38 as a refrigerant super-heat degree TSH of the indoor heat exchanger 22.

⑦ A function of detecting, in the heating operation mode, a difference in detection temperature between the refrigerant temperature sensors 34 and 32 as a refrigerant super-heat degree TSH of the outdoor heat exchanger 3.

⑧ A function of completely closing and opening (corresponding to 250 pulses), in the cooling operation mode, a liquid electronic expansion valve and a gaseous flow adjustment valve corresponding to a stopped (including an interruption based on indoor temperature control) indoor unit. This function aims at recovering the refrigerant and preventing freezing and dewing.

⑨ A function of opening, in the heating operation mode, a liquid electronic expansion valve and a gaseous flow adjustment valve corresponding to a stopped (including an interruption based on indoor unit temperature control) to predetermined opening degrees. This function aims at suppressing an increase in high-pressure-side pressure and decreasing the pressure acting on the two sides of the flow adjustment valve.

10 A function of executing, upon an increase in the number of operating indoor units in the heating operation mode, initial opening degree control for a flow adjustment valve corresponding to the additional indoor unit.

11 A function of obtaining a difference SH between the detected refrigerant super-heat degree (TSH) and the preset value (=optimum refrigerant super-heat degree) and a change amount ΔSH in difference SH (a difference between the present difference SH and the last difference SH), and performing a fuzzy operation using the difference SH and the change amount ΔSH as the if-part (input), thereby obtaining a necessary amount ΔPLS of the change in opening degree (corresponding to the number of drive pulses) matching the present state of each electronic expansion valve as the then-part (output).

This fuzzy operation function may be executed by using a versatile fuzzy control processor.

12 A function of controlling the opening degree of each electronic expansion valve in accordance with the necessary amount ΔPLS.

13 A function of opening, in the heating operation mode, the two-way valve 6 when the detection temperature (=evaporator temperature) of the heat exchanger temperature sensor 33 becomes a preset value or less. This function aims at defrosting the outdoor heat exchanger 3 by supplying a high-temperature refrigerant.

Figures 1, 3:
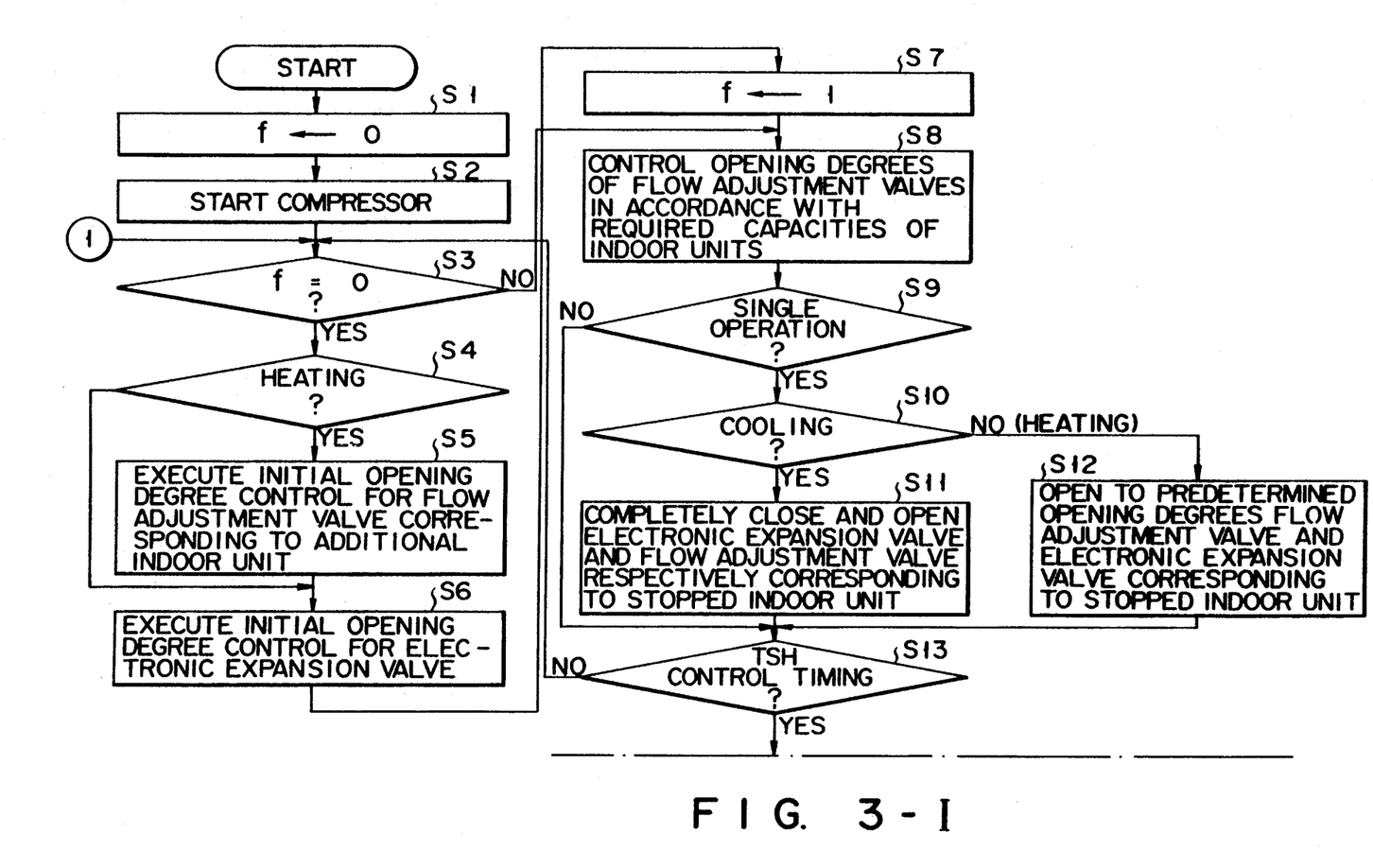
Figures 2, 3:
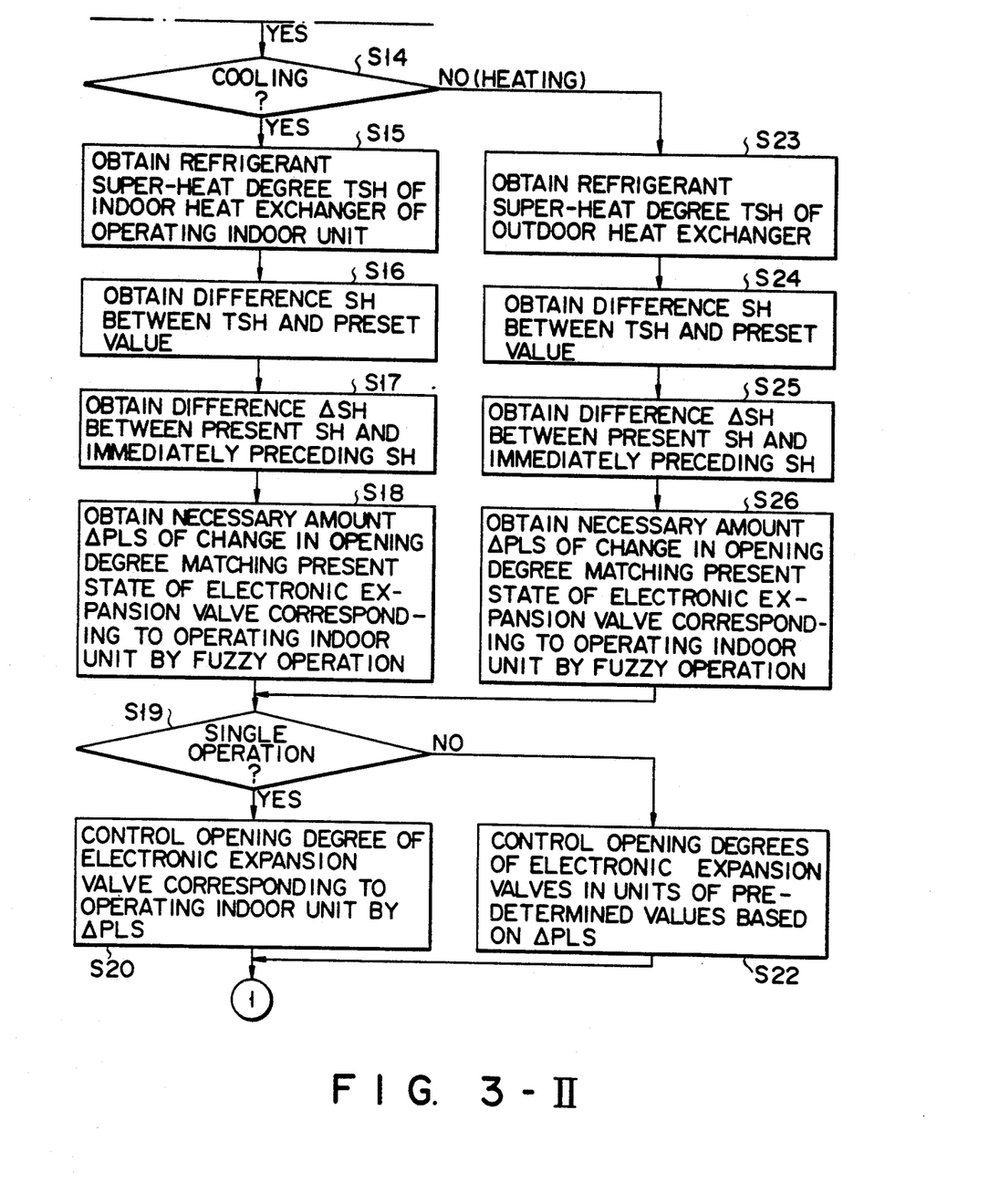

The operation of the multi-type air conditioner system of this embodiment will be described with reference to the steps of the major part of the flow charts of FIGS. 3-I and 3-II.

When the compressor 1 is stopped, the liquid electronic expansion valves 11 and 21 are opened to predetermined opening degrees (e.g., corresponding to 60 pulses), and the gaseous flow adjustment valves 13 and 23 are completely opened (corresponding to 250 pulses), thereby balancing the gas between the respective refrigeration cycles.

Assume that the cooling operation mode and desired indoor temperatures are set by the remote controllers 62 of the indoor units $B_1$ and $B_2$ and that the operation is started.

In this case, step $S_1$ for initializing the capacity of the compressor 1 is executed, and the compressor 1 is started in step $S_2$. Then, the refrigerant discharged from the compressor 1 flows through the four-way valve 2, the outdoor heat exchanger 3, the electronic expansion valves 11 and 21, the indoor heat exchangers 12 and 22, the flow adjustment valves 13 and 23, the four-way valve 2, and the accumulator 4, as indicated by a solid arrow in FIG. 1, thereby starting the parallel cooling operation of the indoor units $B_1$ and $B_2$.

During the parallel cooling operations, the capability of the compressor 1 (=the output frequency F of the inverter circuit 51) is controlled in accordance with the sum of the required capacities $Q_1$ and $Q_2$ (corresponding to the differences between preset indoor temperatures and detection temperatures of the indoor temperature sensors 61) of the respective indoor units $B_1$ and $B_2$. At the same time, the opening degree of the flow adjustment valve 13 is controlled in accordance with the required capacity $Q_1$ of the indoor unit $B_1$, and the opening degree of the flow adjustment valve 23 is controlled in accordance with the required capacity $Q_2$ of the indoor unit $B_2$ (step S8).

Figure 4:
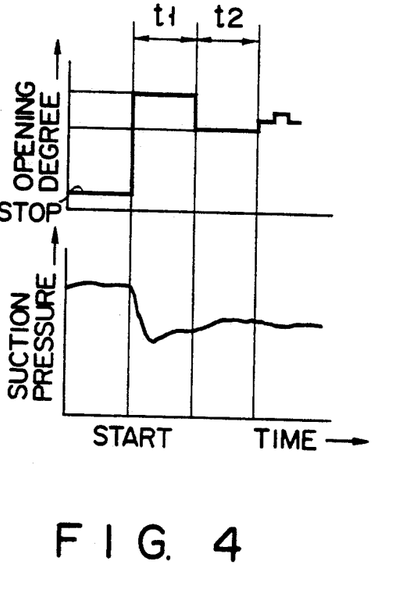
FIG. 4 is a graph for explaining initial opening degree control for an electronic expansion valve of the first embodiment of the present invention.

When the compressor 1 is started, initial opening degree control for the electronic expansion valves 11 and 21 is executed for a predetermined period of time ($=t_1+t_2$), as shown in FIG. 4 (step S6).

That is, during an initial period $t_1$, the electronic expansion valves 11 and 21 are opened wide, and during a following period $t_2$, the electronic expansion valves 11 and 21 are closed to predetermined opening degrees.

When the electronic expansion valves 11 and 21 are opened wide at the beginning, a decrease in refrigerant pressure at the suction side of the compressor 1 is suppressed, and a difference in refrigerant pressure between the discharge side and the suction side of the compressor 1 is decreased.

When the difference in refrigerant pressure between the discharge side and the suction side is decreased, the refrigerant suction amount of the compressor 1 is decreased. Accordingly, even if the liquid refrigerant is stored in the low-pressure-side pipe of the refrigeration cycle, the amount of liquid refrigerant drawn by vacuum into the compressor 1 is small, and a so-called liquid return phenomenon is avoided to prevent the compressor 1 from being damaged.

During the period $t_2$, the opening degrees of the electronic expansion valves 11 and 21 are reduced. If the opening degrees are kept large a liquid return phenomenon is eventually caused. This reduction in opening degrees is to prevent such inconvenience.

Figure 5:
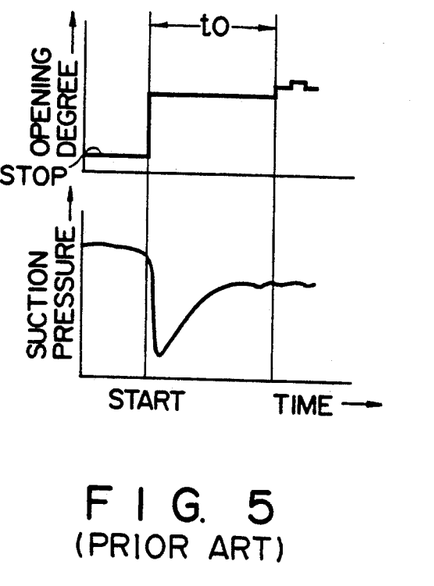
FIG. 5 is a graph showing initial opening degree control for an electronic expansion valve of a conventional air conditioner as a reference.

FIG. 5 shows conventional initial opening degree control of an electronic expansion valve as a reference. More specifically, conventionally, the electronic expansion valve is kept at a predetermined opening degree during a period $t_0$ after start of the compressor. In this case, the refrigerant pressure in the suction side of the compressor is largely decreased, and the suction amount of the compressor is increased, thus causing liquid returning to the compressor.

Completion of the initial opening degree control of the electronic expansion valves 11 and 21 provides a timing for refrigerant super-heat degree (TSH control (step S13).

At the TSH control timing, first, a difference between the detection temperature of the refrigerant temperature sensor 35 (=refrigerant saturation temperature) and the detection temperature of the refrigerant temperature sensor 37 is detected as a refrigerant super-heat degree $TSH_1$ of the indoor heat exchanger 12 (step S15).

A difference $SH_1$ between the detected refrigerant super-heat degree $TSH_1$ and the preset value (=optimum refrigerant super-heat degree) is obtained, and a change amount $\Delta SH_1$ in difference $SH_1$ (a difference between the present difference $SH_1$ and the immediately preceding difference $SH_1$) is obtained.

A fuzzy operation is executed by using the obtained difference $SH_1$ and change amount $\Delta SH_1$ as the if-part (input), so that a necessary amount $\Delta PLS_1$ of the change in opening degree (corresponding to the number of drive pulses) matching the present state of the electronic expansion valve 11 is obtained as the then-part (output) (step S18). The fuzzy operation will be described in detail later.

Subsequently, a difference between the detection temperature of the refrigerant temperature sensor 36 (=refrigerant saturation temperature) and the detection temperature of the refrigerant temperature sensor 38 is detected as a refrigerant super-heat degree $TSH_2$ of the indoor heat exchanger 22.

A difference $SH_2$ between the detected refrigerant super-heat degree $TSH_2$ and the preset value (=optimum refrigerant super-heat degree) is obtained, and a change amount $\Delta SH_2$ in difference $SH_2$ (a difference between the present difference $SH_2$ and the stored immediately preceding difference $SH_2$) is obtained.

A fuzzy operation is executed by using the obtained difference $SH_2$ and change amount $\Delta SH_2$ as the if-part (input), so that a necessary amount $\Delta PLS_2$ of the change in opening degree (corresponding to the number of drive pulses) matching the present state of the electronic expansion valve 21 is obtained as the then-part (output).

The opening degrees of the electronic expansion valves 11 and 21 are controlled in accordance with the obtained necessary amounts $\Delta PLS_1$ and $PLS_2$ (step S20).

The TSH control timing is set after each predetermined period of time, and super-heat degree control based on the fuzzy operation is repeated at each TSH control timing.

The fuzzy operation will be described.

A 7-class, triangular type membership function (FIG. 9) having a control width of "−8 to +8" of the difference SH (the difference between the detected refrigerant super-heat degree THS and the preset value) is prepared as the if-part and stored in a memory 52 of the outdoor control unit 50.

Similarly, a 7-class, triangular type membership function (FIG. 10) having a control width of "−5 to +5" of the change amount ΔSH (the difference between the present difference SH and the stored immediately preceding difference SH) is prepared as the if-part and stored in the memory 52 of the outdoor control unit 50.

Figure 9:
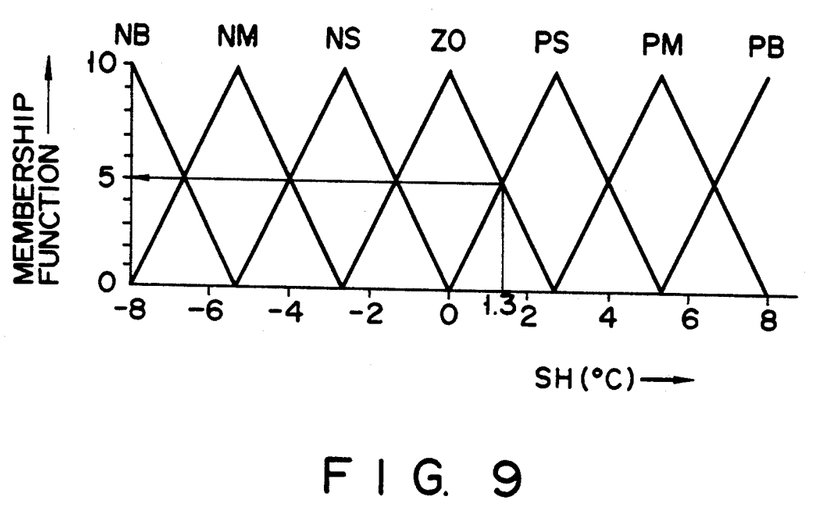
FIG. 9 is a graph showing a relationship between a difference SH and a membership function used in a fuzzy operation of the first embodiment of the present invention.
Figure 10:
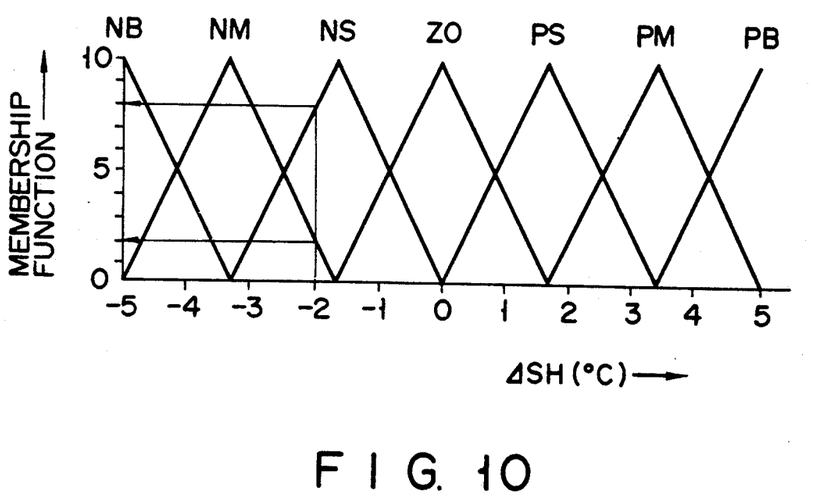
FIG. 10 is a graph showing a relationship between a change $\Delta$SH in difference and a membership function used in the fuzzy operation of the first embodiment of the present invention.

In each membership function, abbreviation NB stands for Negative Big; NM, Negative Middle; NS, Negative Small; ZO, Zero (neutral); PS, Positive Small; PM, Positive Middle; and PB, Positive Big.

When the difference SH is actually input, its fuzzy variable grade is calculated from itself and the membership function of FIG. 9.

When the change amount ΔSH is input, its fuzzy variable grade is calculated from itself and the membership function of FIG. 10.

Figure 11:
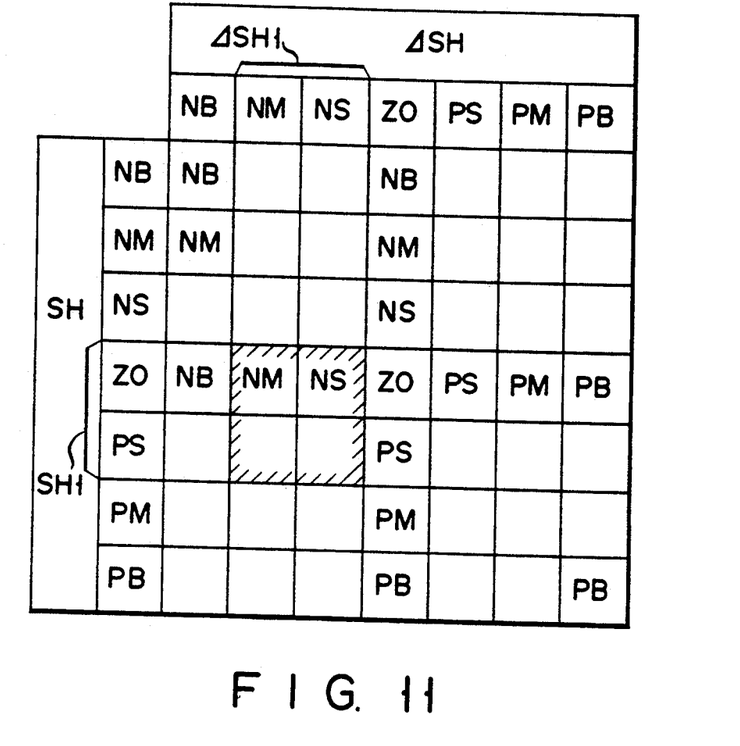
FIG. 11 is a table showing the format of the control rules used in the fuzzy operation of the first embodiment of the present invention.

The memory 52 of the outdoor control unit 50 also stores a format of the control rules shown in FIG. 11. A fuzzy variable grade of the necessary amount ΔPLS is obtained on the basis of the control rules and the two fuzzy variable grades calculated in the above manner.

A 7-class, triangular type membership function (FIG. 12) having control widths of "−6 to +6" and "−12 to +12" of the necessary amount ΔPLS is prepared as the then-part and stored in the memory 52 of the outdoor control unit 50. The control width of "−6 to +6" is selected for the single indoor unit operation. The control width of "−12 to +12" is selected for the double indoor unit operation.

An operation for a union of sets is executed based on the membership function of the necessary amount ΔPLS and the fuzzy variable grade of the obtained necessary amount ΔPLS in accordance with the Min-Max method, thereby obtaining the necessary amount ΔPLS of the change in opening degree matching the present state of the electronic expansion valve. The fuzzy operation is thus completed.

As an example of the fuzzy operation, a case in which a deviation $SH_1 = +1.3$ and a gradient $SH_1 = -2$ will be described.

First, grade 5 of PS and grade 5 of ZO are obtained from SH = +1.3 of FIG. 9.

Then, grade 8 of NS and grade 2 of NM are obtained from ΔSH = −2 of FIG. 10.

It is known that the union of the sets SH and ΔSH comprises NM and NS (hatched portion in FIG. 11) in accordance with the rule shown in FIG. 11.

Of the union of sets, the grade of NM is determined to be 5 by selecting a larger one of:
① grade of ZO of the set SH: 5
② grade of NM of the set ΔSH: 2

The grade of NS is determined to be 8 by selecting a larger one of:
① grade of ZO of the set SH: 5
② grade of NS of the set ΔSH: 8

Figure 12:
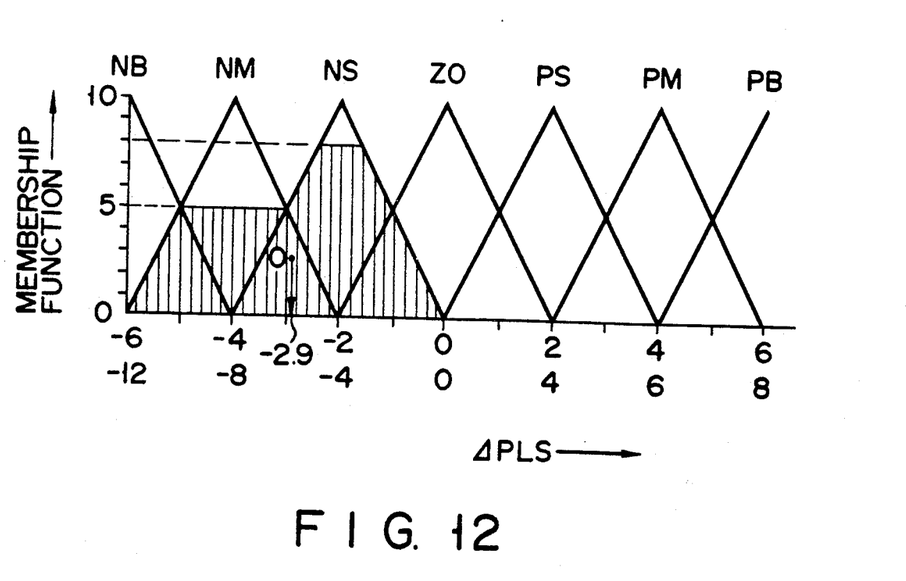
FIG. 12 is a graph showing a relationship between a necessary amount $\Delta$PLS of the change in opening degree and a membership function used in the fuzzy operation of the first embodiment of the present invention.

The NM (grade: 5) and NS (grade: 8) are applied to FIG. 12, and the barycenter O of the hatched portion, i.e., the union of the sets NM and NS is obtained. The obtained value is −2.9.

Therefore, when $SH_1 = +1.3$ and $\Delta SH_1 = -2$, the necessary amount $\Delta PLS_1$ of the change in opening degree is −2.9, and the opening degree of the electronic expansion valve 11 may be controlled in accordance with this value.

Assume that the cooling operation is continued and the indoor temperature of the room where, e.g., the indoor unit $B_2$ is installed becomes the preset indoor temperature or less.

Then, the required capacity $Q_2$ of the indoor unit $B_2$ becomes 0. In response to this, the liquid electronic expansion valve 21 corresponding to the indoor unit $B_2$ is completely closed (corresponding to 0 pulse), and the corresponding gaseous flow adjustment valve 23 is completely open (corresponding to 250 pulses) (step S11).

That is, the refrigerant does not flow into the indoor heat exchanger 22 of the indoor unit $B_2$, the operation of the indoor unit $B_2$ is stopped, and the single cooling operation by the indoor unit $B_1$ is started (step S9).

Regarding the capability of the compressor 1 (=the output frequency F of the inverter circuit 51), it is controlled in accordance with only the required capacity $Q_1$ of the indoor unit $B_1$. At the same time, the opening degree of the flow adjustment valve 13 is controlled in accordance with the required capacity $Q_1$ of the indoor unit $B_1$.

In this case, when the gaseous flow adjustment valve 23 is completely open, the remaining refrigerant in the indoor heat exchanger 22 can be recovered to eliminate the shortage in the refrigerant flow amount in the refrigeration cycle, thereby maintaining an appropriate capability. In addition, since the remaining refrigerant is recovered, freezing and dewing of the indoor heat exchanger 22 can be prevented.

At the TSH control timing, a difference between the detection temperature of the refrigerant temperature sensor 35 (=refrigerant saturation temperature) and the detection temperature of the refrigerant temperature sensor 37 is detected as a refrigerant super-heat degree $TSH_1$ of the indoor heat exchanger 12.

A difference TSH between the detected refrigerant super-heat degree $TSH_1$ and the preset value (=optimum refrigerant super-heat degree) is obtained, and a change amount $\Delta SH_1$ in difference $SH_1$ (a difference between the present difference $SH_1$ and the immediately preceding difference $SH_1$) is obtained.

A fuzzy operation using the obtained difference $SH_1$ and change amount $\Delta SH_1$ as the if-part (input) is executed to obtain a necessary amount $\Delta PLS_1$ of the change in opening degree (corresponding to the number of drive pulses) matching the present state of the electronic expansion valve 11 as the then-part (output).

The electronic expansion valve 11 is controlled in accordance with the obtained necessary amount $\Delta PLS_1$.

Next, assume that the heating operation mode and desired indoor temperatures are set by the respective remote controllers 62 of the indoor units $B_1$ and $B_2$, and that the operation is started.

In this case, when the compressor 1 is started in step $S_2$, the refrigerant discharged from the compressor 1 flows through the four-way valve 2, the flow adjustment valves 13 and 23, the indoor heat exchangers 12 and 22, the electronic expansion valves 11 and 21, the outdoor heat exchanger 3, the four-way valve 2, and the accumulator 4, as indicated by the broken arrow in FIG. 1, so that the parallel heating operations of the indoor units $B_1$ and $B_2$ are started.

In the parallel heating operations, the capability of the compressor 1 (=the output frequency F of the inverter circuit 51) is controlled in accordance with the sum of respective required capacities (each corresponding to the difference between a preset indoor temperature and a detection temperature of the indoor temperature sensor 61) $Q_1$ and $Q_2$ of the indoor units $B_1$ and $B_2$. At the same time, the opening degree of the flow adjustment valve 13 is controlled in accordance with the required capacity $Q_1$ of the indoor unit $B_1$, and the opening degree of the flow adjustment valve 23 is controlled in accordance with the required capacity $Q_2$ of the indoor unit $B_2$ (step S8).

At the start of the compressor 1, initial opening degree control for the electronic expansion valves 11 and 21 is executed for a predetermined period of time $(=t_1+t_2)$ (step S6).

That is, during the first period $t_1$, the electronic expansion valves 11 and 21 are open wide, and during the second period $t_2$, the electronic expansion valves 11 and 21 are closed to predetermined opening degrees.

When the electronic expansion valves 11 and 21 are widely opened first, the decrease in refrigerant pressure at the suction side of the compressor 1 can be suppressed, and the difference in refrigerant pressure between the discharge side and the suction side of the compressor 1 is decreased.

When the difference in refrigerant pressure between the discharge side and the suction side is decreased, the refrigerant suction amount of the compressor 1 is decreased. Accordingly, even if the liquid refrigerant is stored in the low-pressure-side pipe of the refrigeration cycle, the amount of liquid refrigerant drawn by vacuum into the compressor 1 is small, and the so-called liquid return phenomenon is avoided to prevent the compressor 1 from being damaged.

During the period $t_2$, the opening degrees of the electronic expansion valves 11 and 21 are decreased. If the opening degrees are kept large, the liquid return phenomenon will be caused. The opening degrees are decreased in order to avoid such inconvenience.

When initial opening degree control for the electronic expansion valves 11 and 21 is completed, a TSH control timing is set (step S13).

At the TSH control timing, a difference in detection temperature between the refrigerant temperature sensors 34 and 32 is detected as a refrigerant super-heat degree TSH of the outdoor heat exchanger 3 (step S23).

The difference SH between the detected refrigerant super-heat degree TSH and the preset value (=optimum refrigerant super-heat degree) is obtained, and the change amount $\Delta$SH in difference SH (a difference between the present difference SH and the last difference SH) is obtained (steps S24 and S25).

A fuzzy operation using the obtained difference SH and change amount $\Delta$SH as the if-part (input) is executed to obtain a necessary amount $\Delta$PLS of the change in opening degree (corresponding to the number of drive pulses) matching the present state of each of the electronic expansion valves 11 and 21 as the then-part (output) (step S26).

A ratio $Q_1/(Q_1+Q_2)$ is multiplied with the obtained necessary amount $\Delta$PLS, and the opening degree of the electronic expansion valve 11 is controlled in accordance with the product (step S22).

A ratio $Q_2/(Q_1+Q_2)$ is multiplied with the obtained necessary amount $\Delta$PLS, and the opening degree of the electronic expansion valve 21 is controlled in accordance with the product (step S22).

The TSH control timing is set after each predetermined period of time, and super-heat degree control by the fuzzy operation is repeated at each timing.

Assume that the heating operation is continued and that the indoor temperature of the room where, e.g., the indoor unit $B_2$ is installed becomes the preset or higher indoor temperature.

Then, the required capacity $Q_2$ of the indoor unit $B_2$ becomes 0. In response to this, the operation of the indoor unit $B_2$ is stopped, and the single heating operation by the indoor unit $B_1$ is started (step S9).

Regarding the liquid electronic expansion valve 21 and the gaseous flow adjustment valve 23 corresponding to the indoor unit $B_2$, they are kept at predetermined opening degrees, so that the flow of the refrigerant to the indoor heat exchanger 22 is maintained (step S12).

In this manner, when the flow of the refrigerant to the indoor heat exchanger 22 is maintained, the total capacity of the indoor heat exchangers is increased to decrease the condensation temperature, thereby suppressing the increase in high-pressure-side pressure. In addition, the pressure acting on the two sides of the flow adjustment valve 23 is decreased, thereby decreasing the load acting on the flow adjustment valve 23.

Regarding the capacity of the compressor 1 (=the output frequency F of the inverter circuit 51), it is controlled in accordance with only the required capacity $Q_1$ of the indoor unit $B_1$. At the same time, the opening degree of the flow adjustment valve 13 is controlled in accordance with the required capacity $Q_1$ of the indoor unit $B_1$.

At the TSH control timing, a refrigerant super-heat degree TSH of the outdoor heat exchanger 3 is detected in the same manner as described above, and the opening degree of the electronic expansion valve 11 is controlled in accordance with a fuzzy operation.

Thereafter, when the indoor temperature of the room where the indoor unit $B_2$ is installed is decreased to be lower than the preset indoor temperature, the required capacity $Q_2$ of the indoor unit $B_2$ is increased. In response to this, the operation of the indoor unit $B_2$ is resumed and the parallel heating operations are restored.

Figure 6:
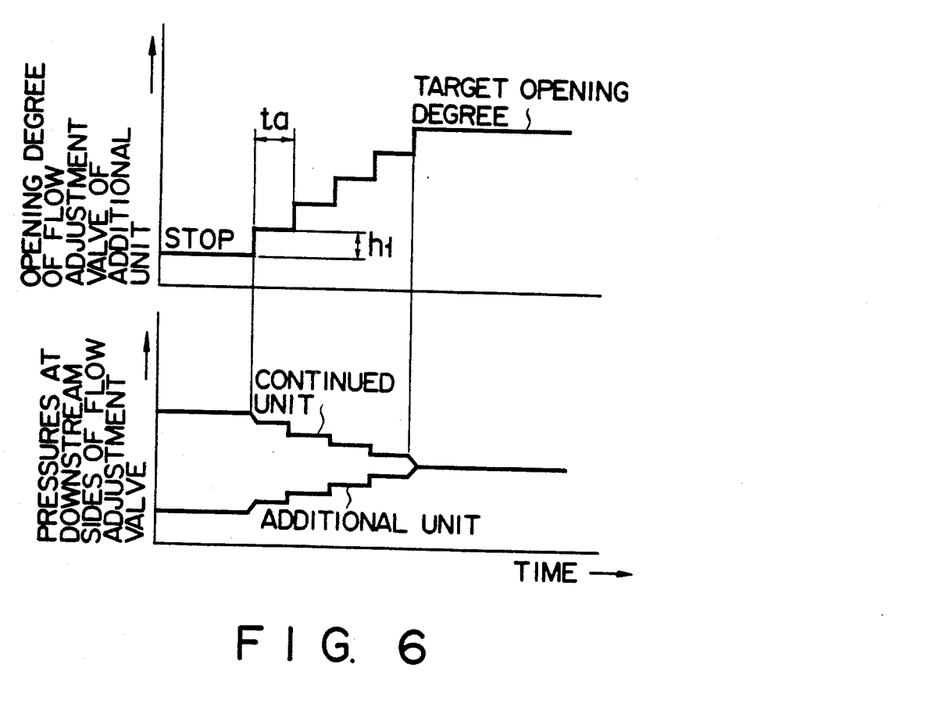
FIG. 6 is a graph for explaining initial opening degree control for a flow adjustment valve of the first embodiment of the present invention.

When the number of operating indoor units is increased, the flow adjustment valve 23 corresponding to the additional indoor unit $B_2$ is subjected to initial opening degree control shown in FIG. 6.

That is, the flow adjustment valve 23 is gradually opened stepwise from a predetermined opening degree for maintaining flow of the refrigerant to a target opening degree based on the required capacity $Q_2$ in units of opening degrees $h_1$ every predetermined period of time ta.

As the flow adjustment valve 23 is gradually opened, even if a large pressure acts on the two sides of the flow adjustment valve 23, the pressure on the downstream side of the flow adjustment valve 23 (the indoor heat exchanger 22 side) is gradually increased. Therefore, loud, uncomfortable refrigerant noise is not produced. Also, since the capacity of the compressor 1 need not be decreased in advance, indoor temperature control is not adversely affected.

In addition, when the flow adjustment valve 23 is to be opened, since it is already open to a predetermined opening degree (for the purpose of maintaining flow of the refrigerant described above) and the pressure acting on its two sides is decreased, it need not endure a large pressure difference. As a result, the drive motors of the flow adjustment valves 13 and 23 can be made small, leading to cost reduction.

Figure 7:
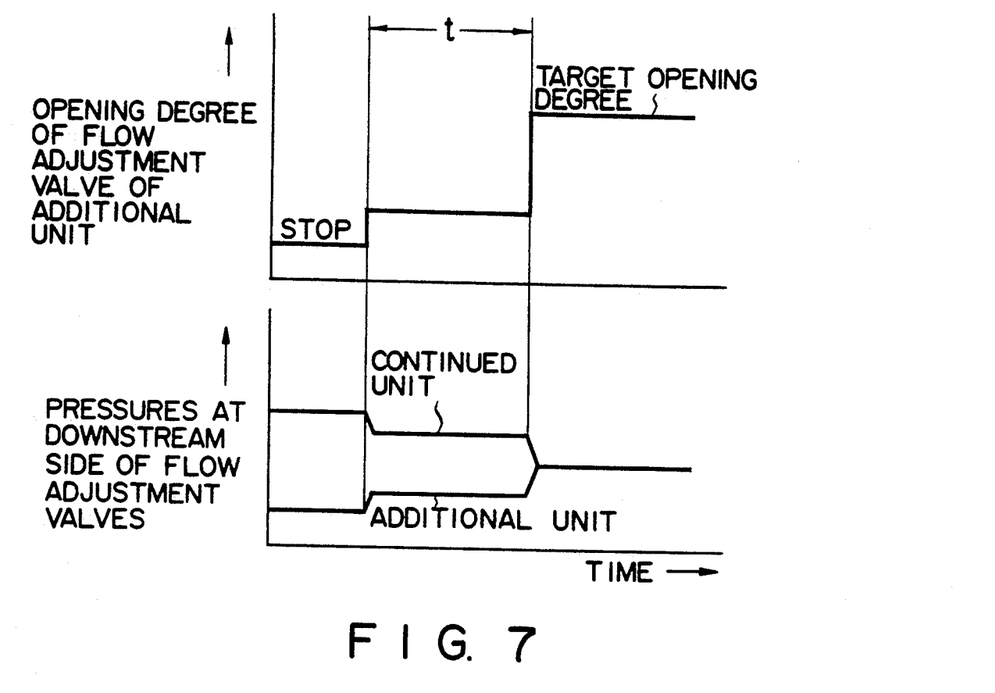
FIGS. 7 and 8 are graphs for explaining modifications of the initial opening degree control of the flow adjustment valve of the first embodiment of the present invention.
Figure 8:
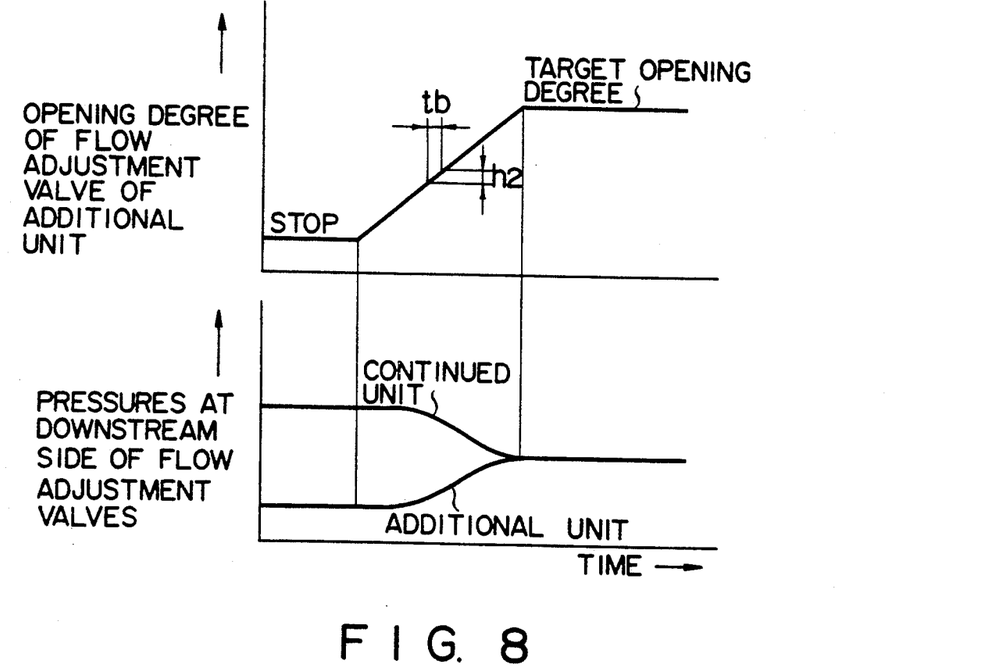

As initial opening degree control for the flow adjustment valve, an opening degree larger than a predetermined opening degree during operation idling may be maintained for a predetermined period of time t, and thereafter the opening degree may be increased to a target opening degree, as shown in FIG. 7. The opening degree may be continuously changed up to the target opening degree by a gradient (h2/tb), as shown in FIG. 8.

As has been described above, the multi-type air conditioner system according to the present invention employs a fuzzy operation for controlling the refrigerant super-heat degree. Therefore, even in the multi-type air conditioner system in which a change in operating state in each indoor unit appears as a large state change of the refrigeration cycle as the control target, the refrigerant super-heat degree can be maintained at an optimum state free from overshooting or hunting while maintaining good responsiveness for the state change of the refrigeration cycle, thus enabling stable, efficient air conditioning.

In the multi-type air conditioner system according to the present invention, at the start of the compressor, the liquid electronic expansion valve is open wide once before normal super-heat degree control is started, in order to decrease the difference in refrigerant pressure between the discharge side and the suction side of the compressor, thereby decreasing the refrigerant suction amount of the compressor. In addition, this large opening degree of the electronic expansion valve is not maintained for a long period of time but is decreased to the predetermined opening degree. Therefore, even if the liquid refrigerant is stored in the low-pressure-side pipe of the refrigeration cycle, the liquid return phenomenon in which the liquid refrigerant is quickly drawn by vacuum into the compressor is avoided. As a result, the reliability can be improved without damaging the compressor.

In the multi-type air conditioner system according to the present invention, in the cooling operation mode, the liquid electronic expansion valve and the gaseous flow adjustment valve corresponding to the stopped indoor unit are completely closed and opened, respectively. Therefore, the remaining refrigerant in the indoor heat exchanger of the stopped indoor unit can be recovered, so that the shortage in refrigerant flow amount is eliminated, thereby maintaining an appropriate capacity. In addition, since the remaining refrigerant is recovered, freezing and dewing of the indoor heat exchanger of the stopped indoor unit can be prevented.

Furthermore, in the multi-type air conditioner system according to the present invention, in the heating operation mode, the liquid electronic expansion valve and the gaseous flow adjustment valve corresponding to the stopped indoor unit are maintained at predetermined opening degrees, and the flow of the refrigerant to the indoor heat exchanger of the stopped indoor unit is maintained. Therefore, the total capacity of the indoor heat exchangers is increased to decrease the condensation temperature, thereby suppressing an increase in high-pressure-side pressure. Furthermore, the pressure acting on the two sides of the flow adjustment valve is decreased, thereby decreasing the load acting on the flow adjustment valve. In particular, when the flow adjustment valve is to be opened due to an increase in number of the operating indoor units, since it is already open to the predetermined opening degree and the pressure acting on its two sides is decreased, it need not endure a large pressure difference. Therefore, the drive motor of the flow adjustment valve can be made small, leading to a cost reduction.

In the multi-type air conditioner system according to the present invention, when the number of operating indoor units is increased, the opening degree of the flow adjustment valve corresponding to the increased indoor unit is gradually increased. Therefore, even if a large pressure acts on the two sides of the flow adjustment valve, the pressure on its downstream side is gradually increased. Therefore, loud, uncomfortable refrigerant noise is not produced. In addition, since the capacity of the compressor need not be decreased in advance, indoor temperature control is not adversely affected. Furthermore, the load acting on the flow adjustment valve can be decreased, resulting in the size reduction of the drive motor of the flow adjustment valve and cost reduction in the same manner as in the above-described air conditioner system.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A multi-type air conditioner system which operates in a cooling mode and in a heating mode, comprising:
   an outdoor unit having at least a compressor and an outdoor heat exchanger;
   a plurality of indoor units each having at least indoor heat exchangers and each having a gaseous side and a liquid side, said outdoor unit connected in parallel with said plurality of indoor units to form a plurality of refrigeration cycles;
   a plurality of gaseous flow adjustment valves each coupled to the gaseous side of one of said plurality of indoor units;
   a plurality of liquid expansion valves each coupled to the liquid side of one of said plurality of indoor units;
   refrigeration super-heat degree detecting means for detecting a refrigerant super-heat degree of said outdoor heat exchanger during the heating mode and said plurality of indoor heat exchangers during the cooling mode;
   control means for controlling a capacity of said compressor and for controlling opening degrees of said gaseous flow adjustment valves in accordance with required capacities of said plurality of indoor units, and for controlling said plurality of liquid expansion valves in accordance with a detection output from said refrigeration super-heat degree detecting means, and for controlling opening degrees of at least one of said plurality gaseous flow adjustment valves and said plurality of liquid expansion valves in accordance with operating states of said multi-type air conditioner system, ·
   said control means comprising means for opening wide once and then closing said electronic expansion valves to predetermined opening degrees at a start of said compressor, and thereafter controlling the opening degrees of said electronic expansion valves so as to cause the detected refrigerant super-heat degree to tend toward the predetermined valve.

2. A system according to claim 1, wherein said flow adjustment valves each comprise pulse motor valves.

3. A system according to claim 1, wherein said electronic expansion valves each comprise pulse motor valves.

4. A system according to claim 1, wherein said control means comprises means for obtaining a first difference between the detected refrigerant super-heat degree and a predetermined preset value and for obtaining a change amount in first difference,
fuzzy operation means for performing a fuzzy operation using the first difference and change amount in first difference to obtain a necessary amount of the change in opening degree matching a present state of said electronic expansion valves, and
means for controlling the opening degrees of said electronic expansion valves in accordance with the necessary amount.

5. A multi-type air conditioner system which operates in a cooling mode and in a heating mode, comprising:
an outdoor unit having at least a compressor and an outdoor heat exchanger;
a plurality of indoor units each having at least indoor heat exchangers and each having a gaseous side and a liquid side, said outdoor unit connected in parallel with said plurality of indoor units to form a plurality of refrigeration cycles;
a plurality of gaseous flow adjustment valves each coupled to the gaseous side of one of said plurality of indoor units;
a plurality of liquid expansion valves each coupled to the liquid side of one of said plurality of indoor units;
refrigeration super-heat degree detecting means for detecting a refrigerant super-heat degree of said outdoor heat exchanger during the heating mode and said plurality of indoor heat exchanger during the cooling mode;
control means for controlling a capacity of said compressor and for controlling opening degrees of said gaseous flow adjustment valves in accordance with required capacities of said plurality of indoor units, and for controlling said plurality of liquid expansion valves in accordance with a detection output from said refrigeration super-heat degree detecting means, and for controlling opening degrees of at least one of said plurality gaseous flow adjustment valves and said plurality of liquid expansion valves in accordance with operating states of said multi-type air conditioner system,
said control means comprising means for completely closing and opening, during the cooling mode operation, one of said electronic expansion valves and one of said flow adjustment valves, respectively, both valves corresponding to a stopped one of said indoor units, and
means for opening, during the heating mode operation said electronic expansion valve and said flow adjustment valve corresponding to said stopped indoor unit.

6. A multi-type air conditioner system which operates in a cooling mode and in a heating mode, comprising:
an outdoor unit having at least a compressor and an outdoor heat exchanger;
a plurality of indoor units each having at least indoor heat exchangers and each having a gaseous side and a liquid side, said outdoor unit connected in parallel with said plurality of indoor units to form a plurality of refrigeration cycles;
a plurality of gaseous flow adjustment valves each coupled to the gaseous side of one of said plurality of indoor units;
a plurality of liquid expansion valves each coupled to the liquid side of one of said plurality of indoor units;
refrigeration super-heat degree detecting means for detecting a refrigerant super-heat degree of said outdoor heat exchanger during the heating mode and said plurality of indoor heat exchangers during the cooling mode;
control means for controlling a capacity of said compressor and for controlling opening degrees of said gaseous flow adjustment valves in accordance with required capacities of said plurality of indoor units, and for controlling said plurality of liquid expansion valves in accordance with a detection output from said refrigeration super-heat degree detecting means, and for controlling opening degrees of at least one of said plurality gaseous flow adjustment valves and said plurality of liquid expansion valves in accordance with operating states of said multi-type air conditioner system, and
means for gradually opening, when an additional indoor unit becomes operative, one of said flow adjustment valves corresponding to the additional indoor unit.

7. An air conditioner system which operates in a cooling mode and in a heating mode, comprising:
an outdoor unit having a compressor, a four-way valve and an outdoor heat exchanger;
a plurality of indoor units each having indoor heat exchangers;
a plurality of refrigeration cycles wherein said compressor, said four-way valve, said outdoor heat exchanger, and said indoor heat exchangers are connected in parallel;
a plurality of electronic expansion valves each disposed in one of a plurality of liquid pipes between said outdoor heat exchanger and one of said indoor heat exchangers;
a plurality of flow adjustment valves each disposed in one of a plurality of gaseous pipes between one of said indoor heat exchangers and said four-way valve;
means for controlling opening degrees of said flow adjustment valves in accordance with required capacities of said indoor units;
means for detecting a refrigerant super-heat degree of each of said indoor heat exchangers during the cooling mode and said outdoor heat exchanger during the heating mode;
means for obtaining first differences between detected refrigerant super-heat degrees and preset values and change amounts in first differences;
means for performing a fuzzy operation using the first differences and change amounts to obtain necessary amounts of the changes in opening degrees matching a present state of said electronic expansion valves; and
means for controlling the opening degree of said electronic expansion valves in accordance with the necessary amounts.

8. An air conditioner system which operates in a cooling mode and in a heating mode, comprising:
an outdoor unit having a compressor, a four-way valve and an outdoor heat exchanger;
a plurality of indoor units each having indoor heat exchangers;
a plurality of refrigeration cycles wherein said compressor, said four-way valve, said outdoor heat exchanger, and said indoor heat exchanger are connected in parallel;
a plurality of electronic expansion valves each disposed in one of a plurality of liquid pipes between said outdoor heat exchanger and one of said indoor heat exchangers;
a plurality of flow adjustment valves each disposed in one of a plurality of gaseous pipes between one of said indoor heat exchangers and said four-way valve;
means for controlling opening degrees of said flow adjustment valves in accordance with required capacities of said indoor units;
means for detecting a refrigerant super-heat degree of each of said indoor heat exchangers during the cooling mode and said outdoor heat exchangers during the heating mode; and
means for opening wide once and then closing, at the start of said compressor, said electronic expansion valves to predetermined opening degrees, and thereafter controlling the opening degrees of said electronic expansion valves so as to cause the detected refrigerant super-heat degrees to tend toward preset values.

9. An air conditioner system comprising:
an outdoor unit having a compressor, a four-way valve and an outdoor heat exchanger;
a plurality of indoor units each having indoor heat exchangers;
a plurality of refrigeration cycles wherein said compressor, said four-way valve, said outdoor heat exchanger, and said indoor heat exchangers are connected in parallel;
a plurality of electronic expansion valves each disposed in one of a plurality of liquid pipes between said outdoor heat exchangers and one of said indoor heat exchangers;
a plurality of flow adjustment valves each disposed in one of a plurality of gaseous pipes between one of said indoor heat exchangers and said four-way valve;
means for flowing a refrigerant discharged from said compressor through said four-way valve, said outdoor heat exchanger, said electronic expansion valves, and said indoor heat exchangers to execute a cooling operation;
means for flowing the refrigerant discharged from said compressor through said four-way valve, said flow adjustment valves, said indoor heat exchangers, said electronic expansion valves, and said outdoor heat exchanger to execute a heating operation;
means for controlling opening degree of said flow adjustment valves in accordance with required capacities of said indoor units;
means for detecting a refrigerant super-heat degree of each of said indoor heat exchangers during the cooling operation of said outdoor heat exchanger during the heating operation; and
means for controlling the opening degrees of said electronic expansion valves so as to cause the detected refrigerant super-heat degrees to tend toward preset values;
means for completely closing and completely opening, in the cooling operation, one of said electronic expansion valves and one of said flow adjustment valves, respectively, both valves corresponding to a stopped one of said indoor units; and
means for opening, in the heating operation, said electronic expansion valve and said flow adjustment valve to predetermined opening degrees, both valves corresponding to the stopped one of said indoor units.

10. An air conditioner system comprising:
an outdoor unit having a compressor, a four-way valve, and an outdoor heat exchanger;
a plurality of indoor units each having indoor heat exchangers;
a plurality of refrigeration cycles wherein said compressor, said four-way valve, said outdoor heat exchanger, and said indoor heat exchangers are connected in parallel;
a plurality of electronic expansion valves each disposed in one of a plurality of liquid pipes between said outdoor heat exchanger and one of said indoor heat exchangers;
flow adjustment valves each disposed in one of a plurality of gaseous pipes between one of said indoor heat exchangers and said four-way valve;
means for flowing a refrigerant discharged from said compressor through said four-way valve, said flow adjustment valves, said indoor heat exchangers, said electronic expansion valves, said outdoor heat exchanger to execute a heating mode operation;
means for controlling opening degrees of said flow adjustment valves in accordance with required capacities of said indoor units;
means for detecting a refrigerant super-heat degree of said outdoor heat exchanger;
means for controlling opening degrees of said electronic expansion valves so as to cause the detected refrigerant super-heat degree to tend toward a preset value; and
means for gradually opening, when an additional indoor unit becomes operative, the opening degree of a flow adjustment valve corresponding to the additional indoor unit.

* * * * *